(12) United States Patent
Abbott et al.

(10) Patent No.: US 10,407,964 B2
(45) Date of Patent: Sep. 10, 2019

(54) DOOR STRIKER ASSEMBLY

(71) Applicant: Nissan North America, Inc., Franklin, TN (US)

(72) Inventors: Spencer Abbott, Ann Arbor, MI (US); Adam Miller, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 246 days.

(21) Appl. No.: 15/491,489

(22) Filed: Apr. 19, 2017

(65) Prior Publication Data

US 2018/0305959 A1 Oct. 25, 2018

(51) Int. Cl.

| | | |
|---|---|---|
| *E05C 7/04* | (2006.01) | |
| *E05F 5/06* | (2006.01) | |
| *E05B 83/38* | (2014.01) | |
| *B60J 5/04* | (2006.01) | |
| *E05B 85/04* | (2014.01) | |

(52) U.S. Cl.
CPC ............. *E05F 5/06* (2013.01); *B60J 5/0479* (2013.01); *E05B 83/38* (2013.01); *E05B 85/045* (2013.01)

(58) Field of Classification Search
CPC .......... E05B 85/04; E05B 85/045; E05F 5/06; E05F 5/00; E05Y 2900/531; Y10S 292/64; Y10T 292/391; Y10T 292/685; Y10T 292/68; Y10T 292/688
USPC .............. 49/366; 292/340, DIG. 64, 341.11, 292/341.12, 341.15
See application file for complete search history.

(56) References Cited

U.S. PATENT DOCUMENTS

| | | | |
|---|---|---|---|
| 5,707,092 A | 1/1998 | Van Slembrouck et al. | |
| 6,042,160 A | 3/2000 | Hamada et al. | |
| 6,155,618 A | 12/2000 | Ichinose | |
| 6,692,046 B2 * | 2/2004 | Paskonis | E05B 77/10 29/410 |
| 6,883,842 B2 | 4/2005 | Paskonis | |
| 7,097,219 B2 * | 8/2006 | Paskonis | E05B 85/045 292/340 |
| 7,703,818 B2 * | 4/2010 | Fannon | E05B 85/045 292/340 |

(Continued)

FOREIGN PATENT DOCUMENTS

| | | |
|---|---|---|
| EP | 0894918 B1 | 11/2002 |
| JP | 5999437 A | 9/2016 |

*Primary Examiner* — Chi Q Nguyen
(74) *Attorney, Agent, or Firm* — Global IP Counselors, LLP

(57) ABSTRACT

A door striker assembly includes a base plate, a reinforcement plate and a striker wire. The base plate has a first surface and a second surface, with a first opening, and a second opening both extending from the first surface to the second surface. The first surface has an offset portion with the first opening being open to the offset portion. The reinforcement plate is dimensioned to fit within the offset portion of the first surface and has a third opening aligned with the first opening. The striker wire has a first end, a second end and a latch engaging portion located between the first end and the second end. The first end extends through the first opening and the third opening and is non-movably connected to at least one of the reinforcement plate and the base plate. The second end extends through the second opening and is non-movably connected to the base plate.

11 Claims, 10 Drawing Sheets

(56) References Cited

U.S. PATENT DOCUMENTS

| | | | | |
|---|---|---|---|---|
| 7,784,852 B2* | 8/2010 | Fannon | ................. | E05B 85/045 |
| | | | | 296/146.9 |
| 8,944,479 B2* | 2/2015 | Muramatsu | ............. | E05B 77/36 |
| | | | | 16/82 |
| 9,316,021 B2* | 4/2016 | Burciaga | ................. | E05B 77/38 |
| 9,562,376 B2* | 2/2017 | Dey | ........................ | E05B 77/38 |
| 2004/0119299 A1* | 6/2004 | Paskonis | ............... | E05B 85/045 |
| | | | | 292/340 |
| 2005/0218669 A1* | 10/2005 | Johnson | ................ | E05B 85/045 |
| | | | | 292/340 |
| 2007/0001468 A1* | 1/2007 | Burton | ................... | E05B 83/24 |
| | | | | 292/340 |
| 2009/0079208 A1* | 3/2009 | Mizuno | ................. | B21K 25/00 |
| | | | | 292/340 |
| 2012/0112477 A1* | 5/2012 | Muramatsu | ............. | E05B 77/36 |
| | | | | 292/340 |
| 2013/0285395 A1* | 10/2013 | Burciaga | ................ | E05B 77/38 |
| | | | | 292/340 |

* cited by examiner

DOOR STRIKER ASSEMBLY

BACKGROUND

Field of the Invention

The present invention generally relates to a door striker assembly. More specifically, the present invention relates to a vehicle door striker assembly that has a base plate with two-piece design that can be employed in a variety of applications.

Background Information

Striker assemblies are used as a rigid structure that receives a latch mechanism of a door such that with the latch mechanism in an engaged orientation relative to the striker assembly, the door is non-movably connected to the striker assembly.

SUMMARY

One object of the disclosure is to simplify manufacturing of a door striker assembly with a flexible design can be configured for differing applications.

In view of the state of the known technology, one aspect of the present disclosure is to provide a door striker assembly with a base plate, a reinforcement plate and a striker wire. The base plate has a first surface and a second surface, with a first opening and a second opening that both extend from the first surface to the second surface. The first surface has an offset portion with the first opening being open to the offset portion. The reinforcement plate is dimensioned to fit within the offset portion of the first surface and has a third opening that aligns with the first opening. The striker wire has a first end, a second end and a latch engaging portion located between the first end and the second end. The first end extends through the first opening and the third opening, and is non-movably connected to at least one of the reinforcement plate and the base plate. The second end extends through the second opening and is non-movably connected to the base plate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
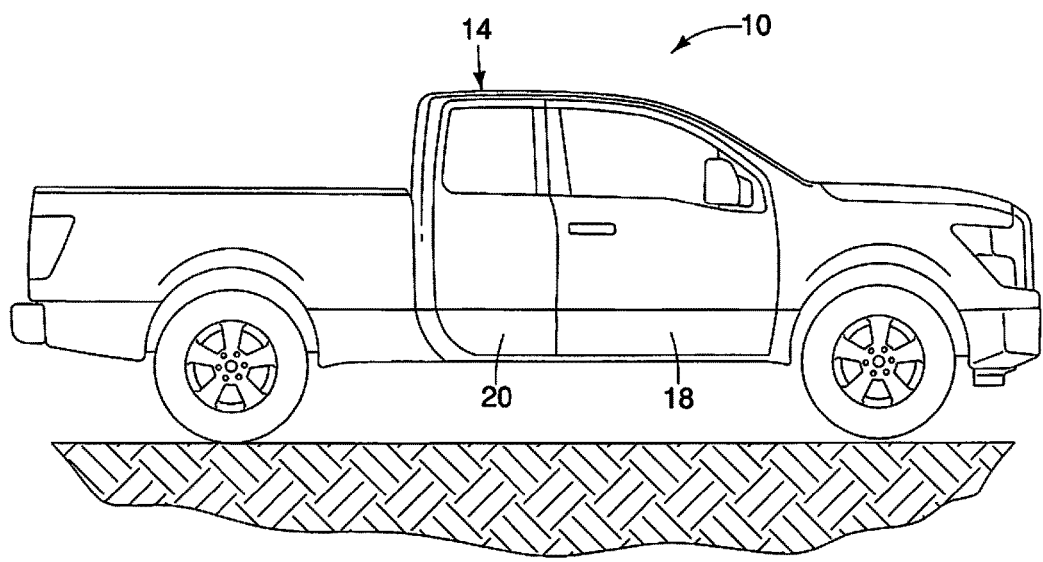
FIG. 1 is a side view of a vehicle showing a front door and a rear door in closed orientations covering a door striker assembly in accordance with a first embodiment.

Referring initially to FIG. 1, a vehicle 10 that includes a door striker assembly 12 (shown in FIGS. 3-8) is illustrated in accordance with a first embodiment.

Figure 2:
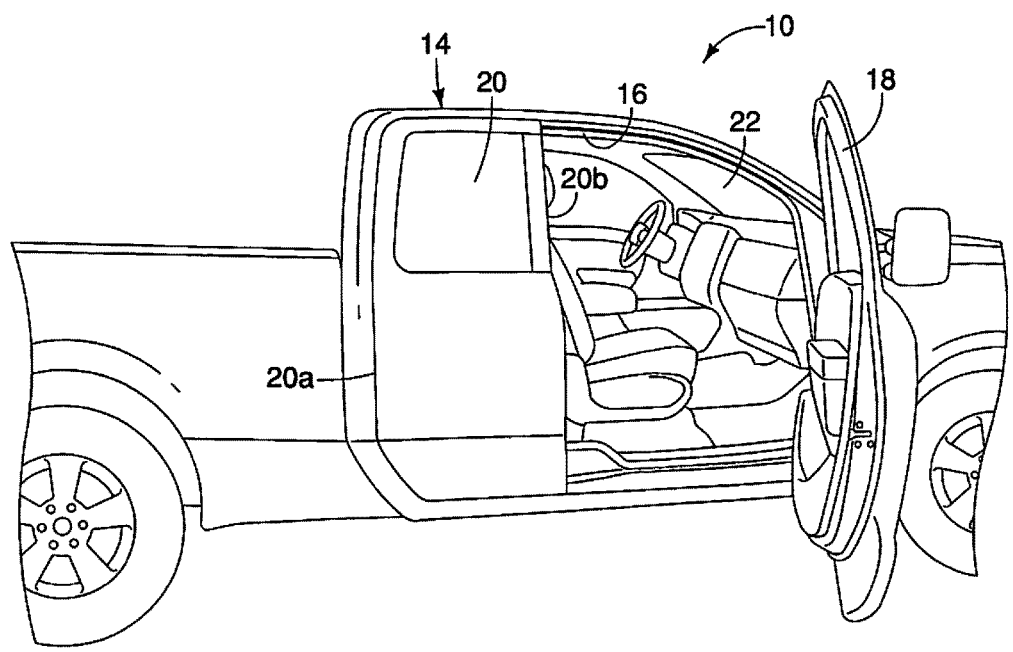
FIG. 2 is a perspective side view of the vehicle showing the front door in an open orientation in accordance with the first embodiment.

As shown in FIGS. 1, 2 and, 3, the vehicle 10 is a pickup truck that includes vehicle body structure 14 that defines a single door opening 16 with a front door 18 and a rear door 20. Although only one side of the vehicle 10 is shown in the drawings, the opposite side of the vehicle 10 includes another door opening 16, another front door 18 and another rear door 20. The door opening 16 exposes a passenger compartment 22 defined within the vehicle body structure 14.

The front door 18 pivots about hinges (not shown) that are located at a front area of the front door 18 in a conventional manner. The front door 18 pivots between a closed orientation covering a portion of the door opening 16 (FIG. 1) and an open orientation exposing the portion of the door opening 16 (FIGS. 2 and 3).

Figure 3:
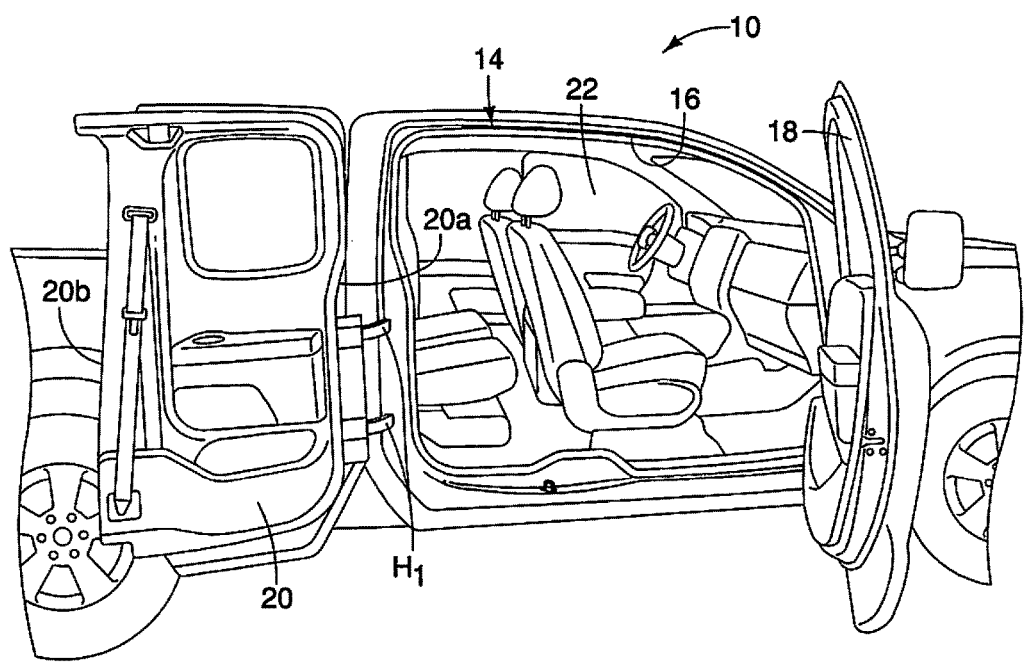
FIG. 3 is another perspective side view of the vehicle showing both the front door and the rear door in open orientations revealing the door striker assembly attached to a sill structure of the vehicle in accordance with the first embodiment.

The rear door 20 pivots about hinges $H_1$ that are attached to a rear portion 20a of the rear door 20, as shown in FIG. 3. The rear door 20 is configured to pivot between a closed orientation (FIGS. 1 and 2) covering a portion of the door opening 16, and an open orientation exposing the door opening 16 (FIG. 3). As is also shown in FIG. 3, the vehicle body structure 14 is constructed without a B-pillar (the B-pillar being an upright structural element that typically divides a front door opening from a rear door opening). Instead, a B-pillar is defined by a front portion 20b of the rear door 20, when the rear door 20 is in the closed orientation (FIGS. 1 and 2).

Figure 4:
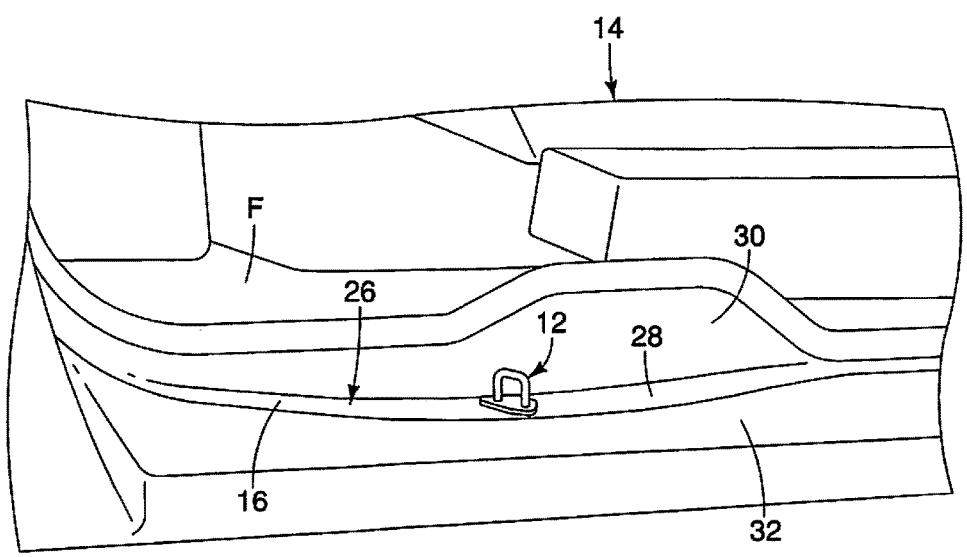
FIG. 4 is a perspective view of the sill structure of the vehicle showing the door striker assembly in accordance with the first embodiment.
Figure 5:
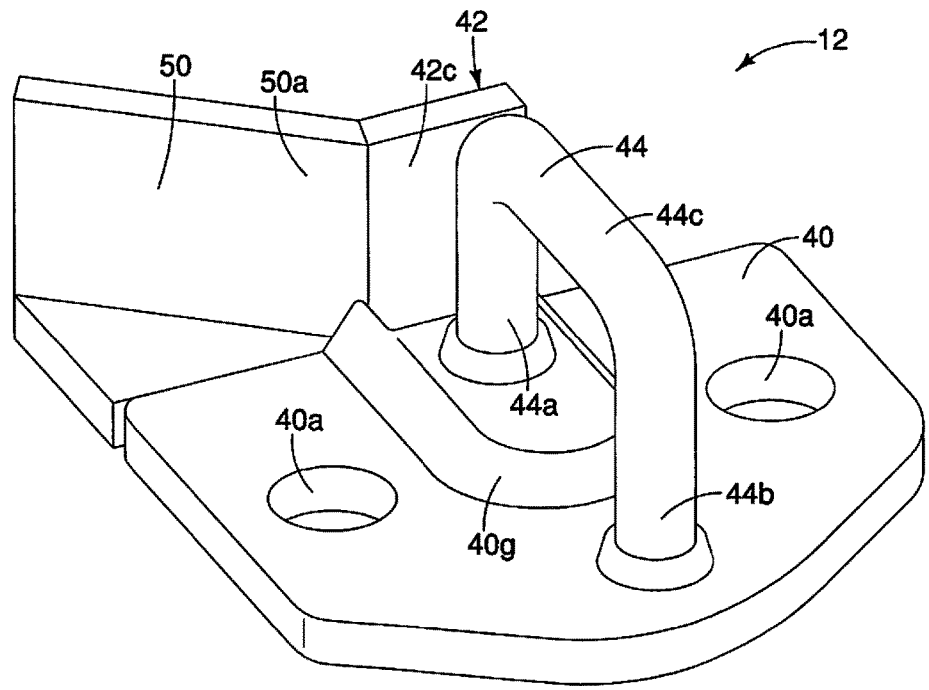
FIG. 5 is a perspective view of the door striker assembly that includes a base plate, a reinforcement plate and a striker wire shown removed from the vehicle in accordance with the first embodiment.

The door opening 16 is further defined by a sill structure 26 that defines and extends a lower perimeter of the door opening 16 in a conventional manner. The sill structure 26 includes a horizontal surface 28, a first vertical surface 30 and a second vertical surface 32. The first vertical surface 30 extends upward from an inboard edge of the horizontal surface 28. The second vertical surface 32 extends downward from an outboard edge of the horizontal surface 28, as shown in FIG. 4.

The door striker assembly 12 is attached to the horizontal surface 28 between the first vertical surface 30 and second vertical surface 32. A second one of the door striker assembly 12 can also be attached to a part of the structure at the top of the door opening 16. Further, an additional pair of door striker assemblies 12 can be installed to the unseen side of the vehicle 12. However, for the sake of brevity, only one of the door striker assemblies 12 is described herein below.

The door striker assembly 12 is configured and positioned to receive a portion of a door latch mechanism $D_L$ (shown in FIG. 10) that engages the door striker assembly 12 with the rear door 20 in the closed orientation. The engagement between the door latch mechanism $D_L$ and the door striker assembly 12 secures the rear door 20 in the closed orientation until the door latch mechanism is operated to release the rear door 20 and allow the rear door 20 to move to the open orientation. Since door latch mechanisms are conventional mechanisms, well known in the art, further description of the door latch mechanism $D_L$ is omitted for the sake of brevity.

A description of a first embodiment of the door striker assembly 12 is now provided with specific reference to FIGS. 5-11. The door striker assembly 12 basically includes a base plate 40, a reinforcement plate 42 and a striker wire 44.

Figure 6:
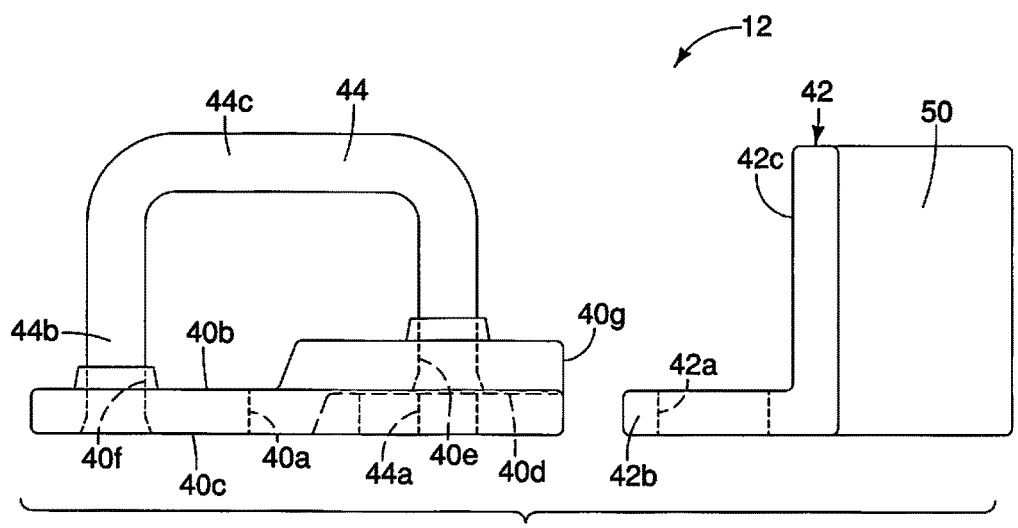
FIG. 6 is an exploded side view of the door striker assembly showing the reinforcement plate separated from the base plate and the striker wire in accordance with the first embodiment.
Figure 7:
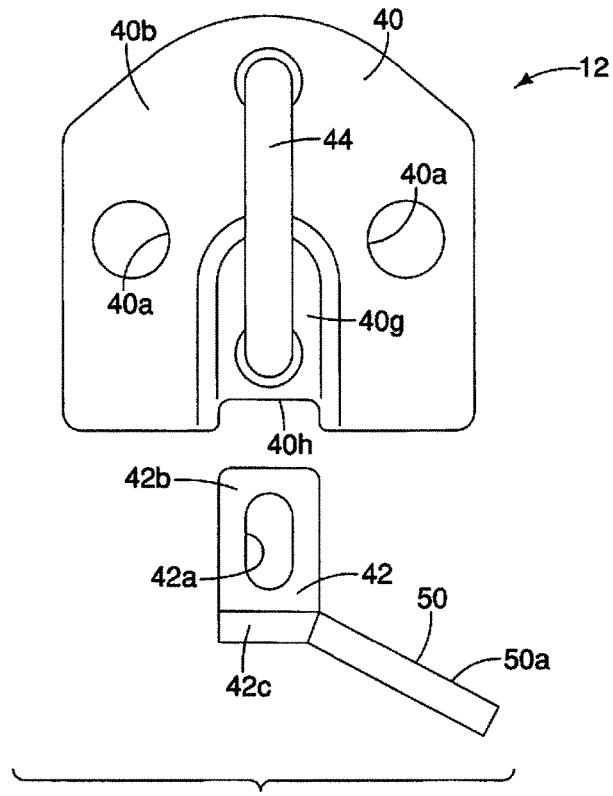
FIG. 7 is an exploded top view of the door striker assembly showing the reinforcement plate separated from the base plate and the striker wire in accordance with the first embodiment.

The base plate 40 includes a pair of fastener receiving openings 40a that are configured and located to receive fasteners F (FIGS. 10 and 11) that attach the base plate 40 to the horizontal surface 28 of the sill structure 26. The base plate 40 further includes an upper surface 40b and a lower surface 40c that overlays a portion of the horizontal surface 28 of the sill structure 26. As shown in FIG. 6, the lower surface 40c defines a concaved area or offset portion 40d. A corresponding portion of the upper surface 40b defines a raised portion 40g with a recessed area 40h defined along a vertical edge that extends between the raised portion 40g and the offset portion 40d.

The base plate 40 also includes a first opening 40e and a second opening 40f. The first opening 40e extends from the upper surface 40b to the lower surface 40c within the offset portion 40d (the concaved area). The second opening 40f extends from the upper surface 40b to the lower surface 40c in an area spaced apart from the offset portion 40d.

The reinforcement plate 42 includes a third opening 42a that extends through an attachment portion 42b of the reinforcement plate 42. The reinforcement plate 42 has an overall L-shape as viewed from the side in FIG. 6, with the L-shape being defined by the attachment portion 42b and an upright portion or projection 42c. The attachment portion 42b of the reinforcement plate 42 is dimensioned to fit within the offset portion 40d along the lower surface 40c (a first surface). With the attachment portion 42b inserted into the offset portion 40d of the base plate 40, the third opening 42a aligns with the first opening 40e. The attachment portion 42b has an upper surface that is a planar surface that contacts that portion of the lower surface 40c that defines the offset portion 40d of the base plate 40. With the attachment portion 42b positioned within the offset portion 40d, the projection 42c of the reinforcement plate 42 extends in a direction perpendicular to the attachment portion 42b.

The projection 42c of the reinforcement plate 42 includes an elastic stopper member 50. The elastic stopper 50 is fixedly attached to the projection 42c and has a door contacting surface 50a.

Figure 10:
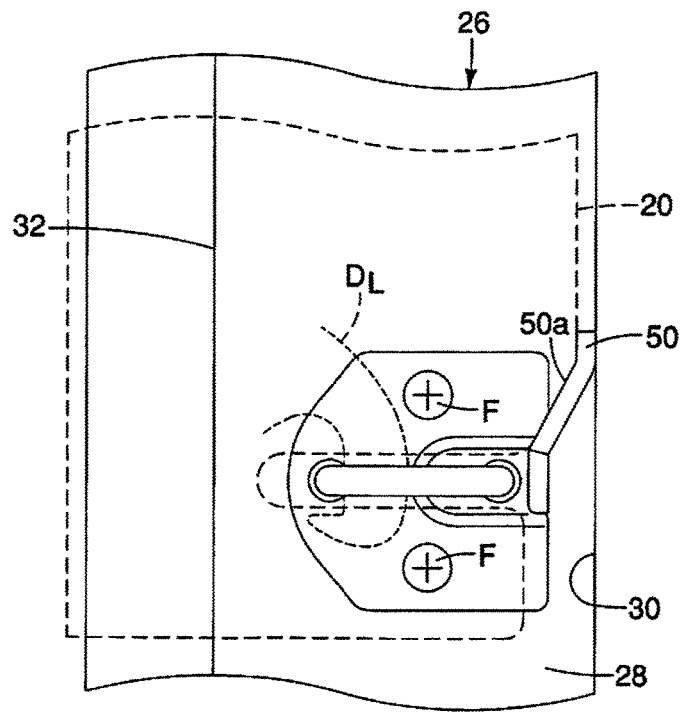
FIG. 10 is another top view of the sill structure with the door striker assembly with the rear door shown in phantom in the closed orientation engaged with the door striker assembly in accordance with the first embodiment.

The striker wire 44 has a first end 44a, a second end 44b and a latch engaging portion 44c located between the first end 44a and the second end 44b. The latch engaging portion 44c has an inverted U-shape and is configured to receive and engage the door latch mechanism $D_L$ of the rear door 20, with the rear door 20 in the closed orientation, as shown in FIG. 10. The striker wire 44 is made of a hardened, heavy gauge metal that is able to withstand repeated engagement and release of the door latch mechanism $D_L$ of the rear door 20 as the rear door 20 is repeatedly opened and closed.

As shown in FIG. 6, the first end 44a of the striker wire 44 extends through the first opening 40e of the base plate 40, and further extends through the third opening 42a of the reinforcement plate 42. The first end 44a is non-movably connected to at least one of the reinforcement plate 42 and the base plate 40 by, for example, conventional welding techniques, deformation (staked) or mechanical fastener (not shown). The second end 44b extends through the second opening 40f of the base plate 40 and is non-movably connected to the base plate 40. The second end 44b is fixedly attached to the base plate 40 by, for example, conventional welding techniques, deformation (staked) or mechanical fastener (not shown).

Figure 8:
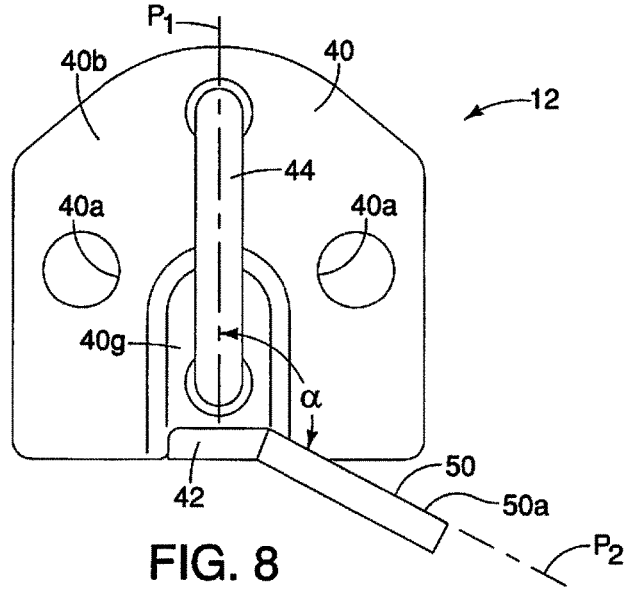
FIG. 8 is a view of the door striker assembly showing the reinforcement plate attached to the base plate and the striker wire in accordance with the first embodiment.
Figure 9:
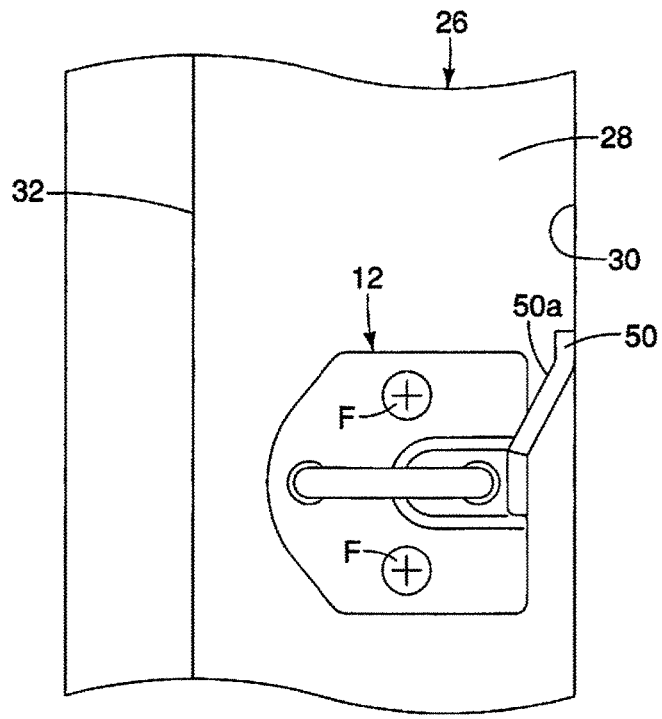
FIG. 9 is a top view of the sill structure with the door striker assembly with the rear door in the open orientation exposing the sill structure and the door striker assembly in accordance with the first embodiment.

As shown in FIG. 8 with the door striker assembly 12 in an uninstalled state, the striker wire 44 defines a first plane $P_1$, and the elastic stopper member 50 (and the door contacting surface 50a) defines a second plane $P_2$ that extends in a direction that is non-parallel to the first plane $P_1$. The first plane $P_1$ and the second plane $P_2$ define an obtuse angle α therebetween (greater than 90 degrees). In the depicted embodiment, the angle α is approximately 120 degrees, but can be any value between 100 and 140 degrees. As shown in FIGS. 9 and 10, once the door striker assembly 12 is installed to the horizontal surface 28 of the sill structure 26, the elastic stopper member 50 can resiliently deform and conform to the orientation of the first vertical surface 30. Further, as shown in FIG. 10, with the rear door 20 in the closed orientation, the rear door 20 contacts the door contacting surface 50a of the elastic stopper member 50. Further, with the rear door 20 in the closed orientation, the rear door 20 compresses the elastic stopper member 50, since the elastic stopper member 50 is confined between the rear door 20 and the first vertical surface 30 of the sill structure 26. The elastic stopper member 50 limits, restricts and/or prevents movement of the rear door 20 when in the closed orientation as the front door 18 is moved between the open orientation and the closed orientation.

It should be understood from the drawings and the description herein that a front area of the rear door 20 defines a B-pillar within the door opening 16, when the rear door 20 is in the closed orientation. Further, the rear door 20 includes either its own striker assembly (not shown) that engages a latch mechanism within the front door 18 with the front door 18 in the closed orientation, as the front door 18 includes in a conventional manner.

The door striker assembly 12 has many advantages over conventional striker assemblies. For example, the door striker assembly 12 has a two-part design, with the base plate 40 and the striker wire 44 defining one part and the reinforcement plate 42 being the other part. The two-part design simplifies the manufacturing costs in that it is possible to eliminate the reinforcement plate 42 and manufacture just the base plate 40 with the striker wire 44. This one part modification can be used in conventional door applications, where a latching mechanism within a conventional front door engages the one part modification of the striker assembly installed to a fixed, conventional B-pillar of a vehicle. The one part modification of the striker assembly can be also used in the rear door 20 for engagement with the latching mechanism within the front door 18.

The two-part door striker assembly 12, as described above, therefore reduces manufacturing costs associated with tooling. The base plate 40 can be manufactured for use in multiple striker assembly configurations. For example, the reinforcement plate 42 can be added to the base plate 40 and striker wire 44 after the base plate 40 and the striker wire 44 are already assembled to one another. Further, the reinforcement plate 42 can be omitted, such that the base plate 40 and the striker wire 44 can be used in applications where the elastic stopper 50 is not necessary. The elastic stopper 50 can serve several purposes. For instance, the elastic stopper 50 provides a cushioning effect when the rear door 20 is being closed. Further, once closed, the elastic stopper 50 can limit, restrict or prevent any movement of the rear door 20 when closed, thereby ensuring that the rear door 20 is in a fixed position when the front door 18 is closed. Thus, the inclusion of the elastic stopper 50 can ensure reliable and consistent closing of the front door 18 since a striker assembly (not shown) provided on the rear door 20 is engaged by a latch mechanism (not shown) installed on the front door 18. Hence, by restricting, limiting and/or preventing movement of the rear door 20 when in the closed orientation, closure of the front door 18 is consistent and reliable.

More specifically, the base plate 40 can be manufacture by, for example, a stamping process, and be a universal component for all vehicles, whether for the right side of the vehicle or the left side of the vehicle.

Figure 11:
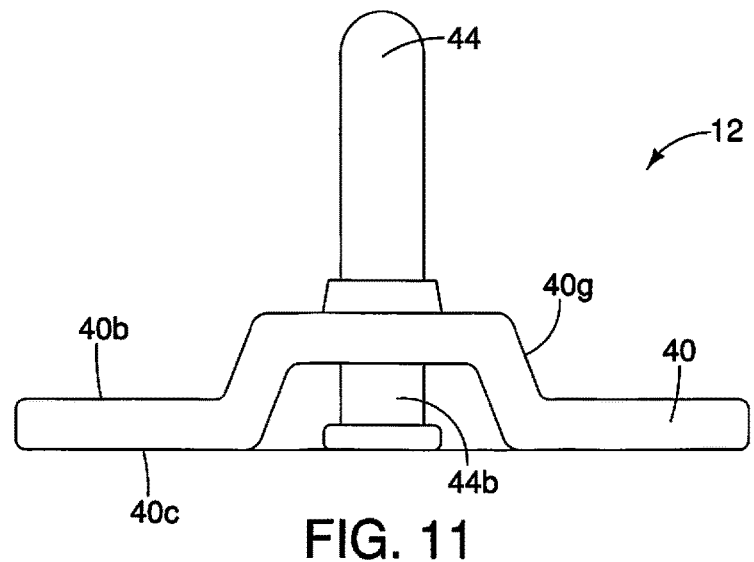
FIG. 11 is an end view of the door striker assembly showing the base plate and the striker wire with the reinforcement plate removed in accordance with the first embodiment.
Figure 12:
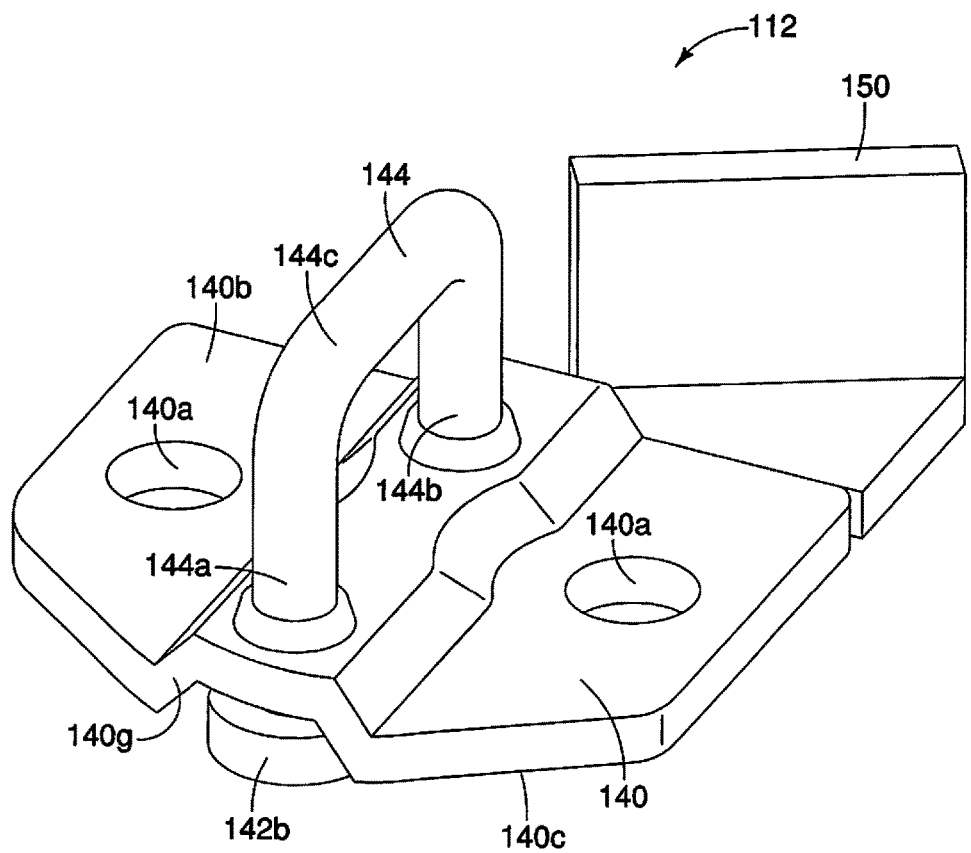
FIG. 12 a perspective view of a door striker assembly that includes a base plate, a reinforcement plate and a striker wire shown removed from the vehicle in accordance with a second embodiment.
Figure 13:
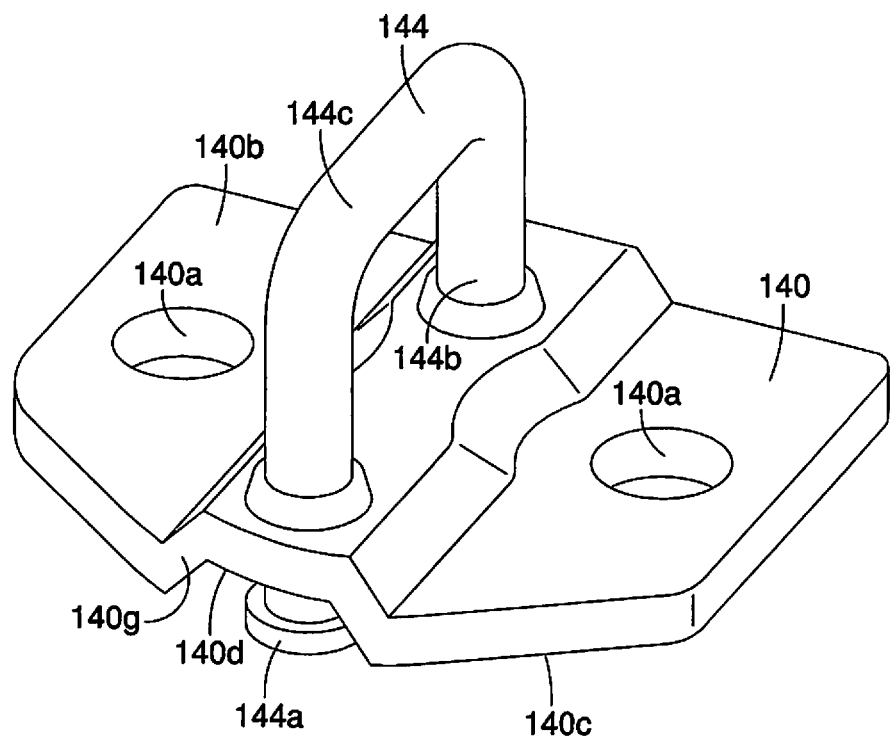
FIG. 13 another perspective view of the door striker assembly similar to FIG. 12, with the reinforcement plate removed from the base plate and the striker wire in accordance with the second embodiment.

The striker wire 44 can be independently attached to the base plate 40 with a portion of the first end 44a of the striker wire 44 being exposed within the offset portion 40d (the concaved area), as shown in FIG. 11. The exposed portion of the first end 44a of the striker wire 44 can be left unused if the reinforcement plate 42 is eliminated.

Further, the base plate 40 can be formed with the recessed area 40h. The recessed area 40h is dimensioned such that with the reinforcement plate 42 installed to the base plate 40 and the striker wire 42, the projection 42c can extend upward within the recessed area 40h, as shown in FIG. 8. Thus, regardless of whether or not the reinforcement plate 42 is used, the footprint (attachment area) of the base plate 40 basically is the same.

It should be understood from the drawings and the description herein that the base plate 40, the reinforcement plate 42, the striker wire 44 and the elastic stopper member 50 are not limited to the depicted shapes and contours as shown in FIGS. 1-11. Rather, the base plate 40 and the reinforcement plate 42 can be manufactured with any of a variety of shapes, with chamfered and/or filleted edges and surfaces. Further, the striker wire 44 can have any of a variety of shapes, serpentine contours, or the like, depending upon the shape and configuration of the doors and the overall vehicle design. As well, the elastic member 50 can have any of a variety of shapes and contours and need not be a planar elastic or flexible member, but can be formed with rounded, cylindrical, or multi-faceted shapes and surfaces.

Second Embodiment

Referring now to FIGS. 12-21, a door striker assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The door striker assembly 112 has many features that are the same as with the door striker assembly 12 of the first embodiment, with some modifications. The door striker assembly 112 basically includes a base plate 140, a reinforcement plate 142 and a striker wire 144.

Figure 14:
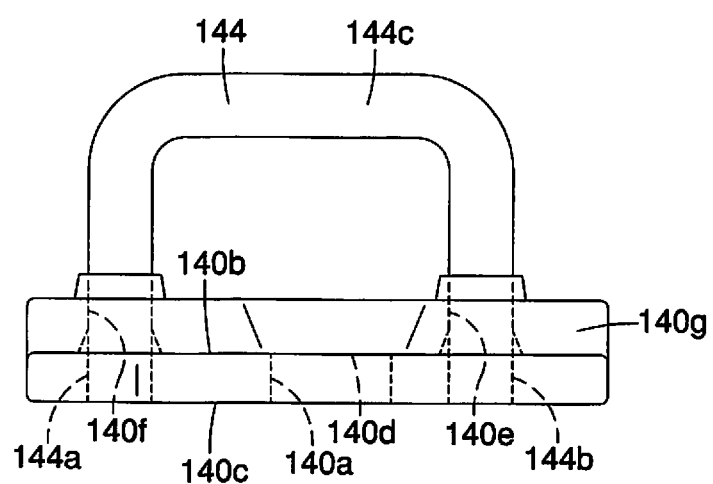
FIG. 14 is a side view of the door striker assembly showing the base plate and the striker wire with the reinforcement plate removed in accordance with the second embodiment.
Figure 15:
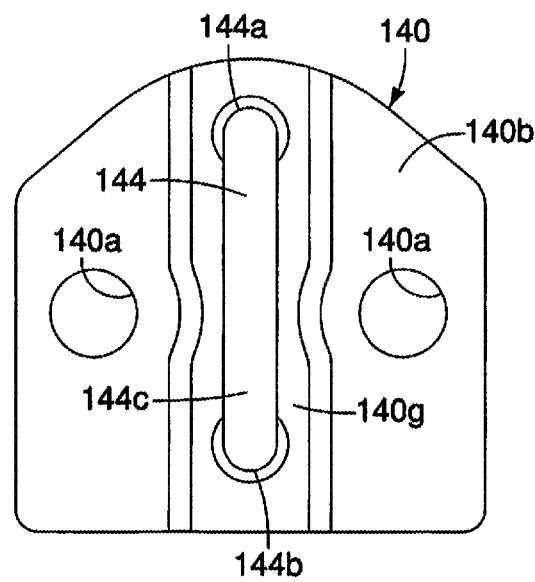
FIG. 15 is a top view of the door striker assembly showing the base plate and the striker wire with the reinforcement plate removed in accordance with the second embodiment.
Figure 21:
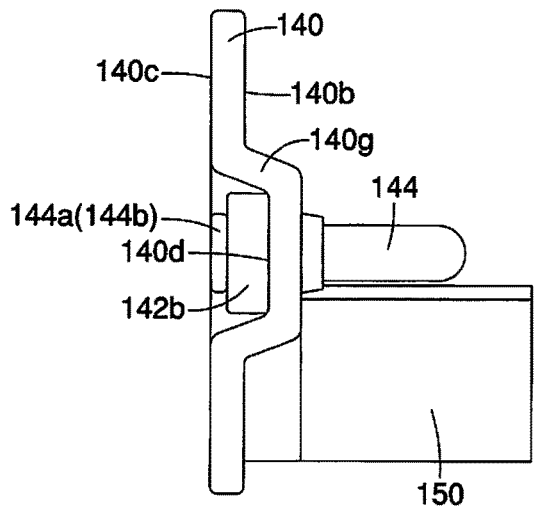
FIG. 21 is an end view of the door striker assembly in accordance with the second embodiment.

The base plate 140 includes a pair of fastener receiving openings 140a that are configured and located to receive fasteners that can attach the base plate 140 to the horizontal surface 28 of the sill structure 26 as described with respect to the first embodiment. The base plate 140 further includes an upper surface 140b and a lower surface 140c. As shown in FIGS. 14 and 21, the lower surface 140c defines a concaved area or offset portion 140d. A corresponding portion of the upper surface 140b defines a raised portion 140g.

The base plate 140 also includes a first opening 140e and a second opening 140f. The first opening 140e and the second opening 140f both extend from the upper surface 140b to the lower surface 140c within the offset portion 140d (the concaved area).

Figure 16:
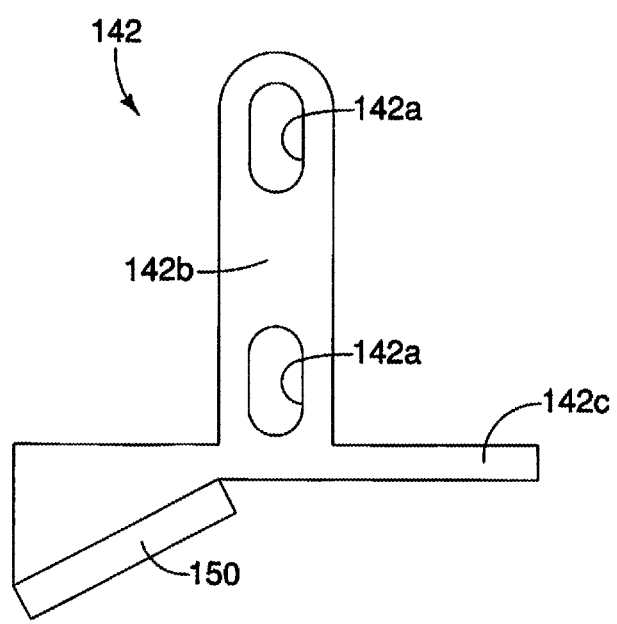
FIG. 16 is a top view of the reinforcement plate removed from the door striker assembly in accordance with the second embodiment.
Figure 17:
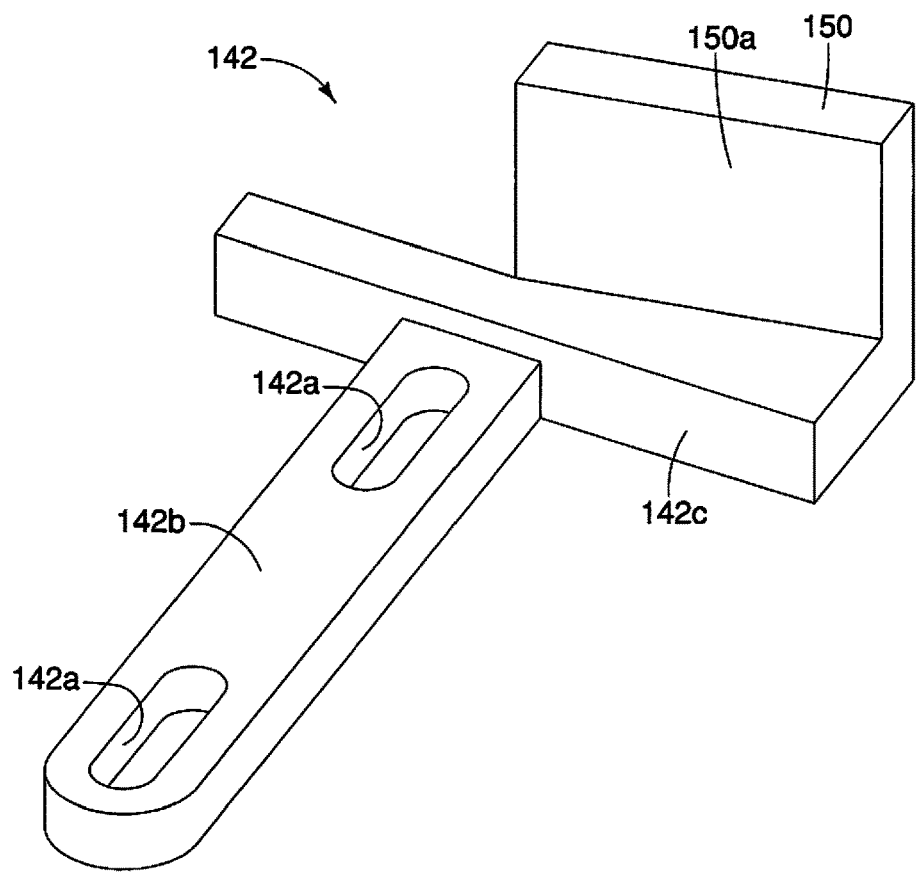
FIG. 17 is a perspective view of the reinforcement plate removed from the door striker assembly in accordance with the second embodiment.
Figure 18:
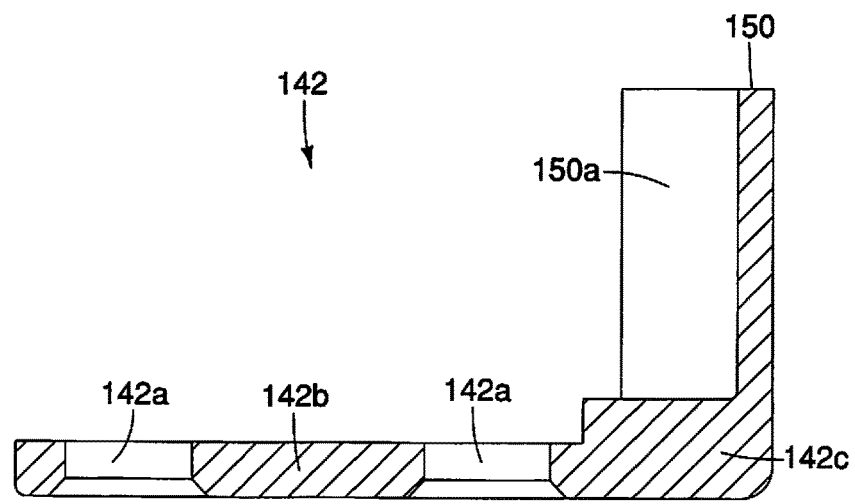
FIG. 18 is a side cross-sectional view of the reinforcement plate removed from the door striker assembly in accordance with the second embodiment.
Figure 19:
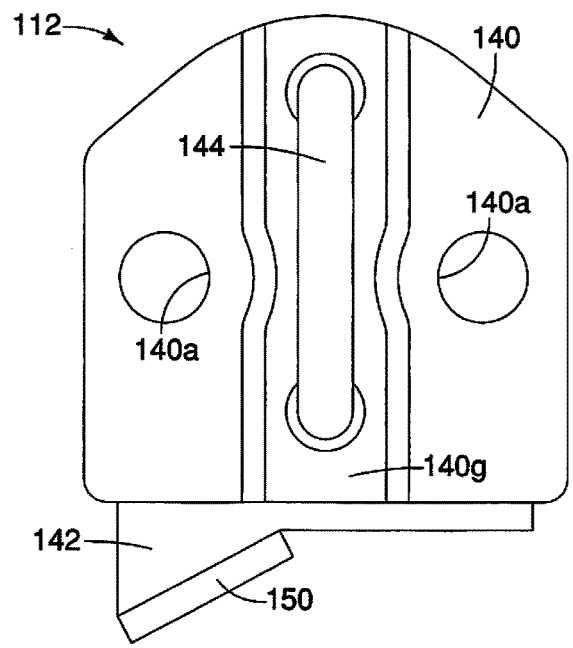
FIG. 19 is a top of the door striker assembly showing the base plate, the striker wire and the reinforcement plate in accordance with the second embodiment.

As shown in FIG. 16, the reinforcement plate 142 includes a third openings 142a that extend through an attachment portion 142b of the reinforcement plate 142. The reinforcement plate 142 has an overall L-shape as viewed from the side in FIGS. 17 and 18, with the L-shape being defined by the attachment portion 142b and an upright portion or projection 142c. The attachment portion 142b of the reinforcement platel 42 is dimensioned to fit within the offset portion 140d along the lower surface 140c. With the attachment portion 142b inserted into the offset portion 140d of the base plate 140, the third openings 42a align with the first opening 140e and the second opening 140f. The attachment portion 142b has an upper surface that is a planar surface that contacts that portion of the lower surface 140c within the offset portion 140d of the base plate 140. With the attachment portion 142b positioned within the offset portion 140d, the projection 142c of the reinforcement plate 142 extends in a direction perpendicular to the attachment portion 142b.

The projection 142c of the reinforcement plate 142 includes an elastic stopper member 150. The elastic stopper 150 is fixedly attached to the projection 142c and has a door contacting surface 150a.

The striker wire 144 has a first end 144a, a second end 144b and a latch engaging portion 144c located between the first end 144a and the second end 144b. The latch engaging portion 144c has an inverted U-shape and is configured to receive and engage the door latch mechanism $D_L$ of the rear door 20, with the rear door 20 in the closed orientation, as shown in FIG. 10, and described above with respect to the first embodiment.

The striker wire 144 is made of a hardened, heavy gauge metal that is able to withstand repeated engagement and release of the door latch mechanism $D_L$ of the rear door 20, as the rear door 20 is repeatedly opened and closed.

Figure 20:
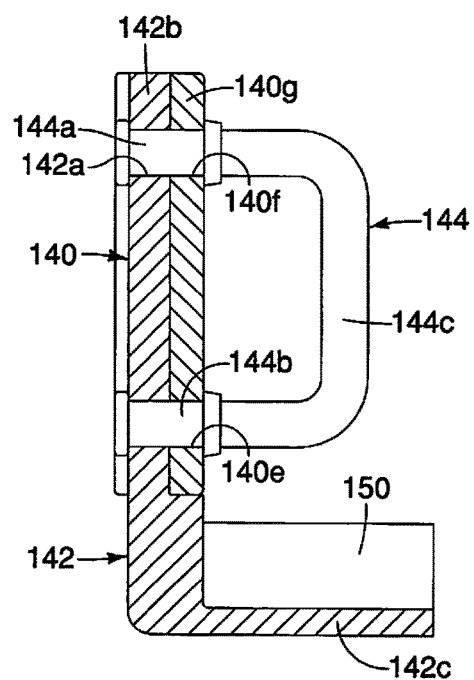
FIG. 20 is a side cross-sectional view of the door striker assembly showing connections between the base plate, the striker wire and the reinforcement plate in accordance with the second embodiment.

As shown in FIG. 20, the first end 144a of the striker wire 144 extends through the first opening 140e of the base plate 140, and further extends through one of the third openings 142a of the reinforcement plate 142. Similarly, the second end 144b of the striker wire 144 extends through the second opening 140f of the base plate 140, and further extends through the other of the third openings 142a of the reinforcement plate 142. The first end 144a and second end 144b are non-movably connected to at least one or both of the reinforcement plate 142 and the base plate 140 by, for example, conventional welding techniques, deformation (staked) or mechanical fastener (not shown).

The door striker assembly 112 has all the benefits as the door striker assembly 12 of the first embodiment.

The various vehicle body structures other than the door striker assemblies 12 and 112 are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the door striker assembly. Accordingly, these terms, as utilized to describe the present invention should be interpreted relative to a vehicle equipped with the door striker assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A door striker assembly comprising:
    a base plate having a first surface and a second surface, with a first opening and a second opening both extending from the first surface to the second surface, the first surface having an offset portion with the first opening being open to the offset portion;
    a reinforcement plate dimensioned to fit within the offset portion of the first surface, the reinforcement plate including an attachment portion and a projection that extends from the attachment portion, the attachment portion being located within the offset portion of the first surface of the base plate, the attachment portion defining a third opening aligning with the first opening, the attachment portion has a planar surface that contacts the offset portion of the first surface of the base plate, with the projection of the reinforcement plate extending in a direction perpendicular to the attachment portion; and
    a striker wire having a first end, a second end and a latch engaging portion located between the first end and the second end, the first end extending through the first opening and the third opening and being non-movably connected to at least one of the reinforcement plate and the base plate, and the second end extending through the second opening and being non-movably connected to the base plate.

2. The door striker assembly according to claim 1, wherein
    the striker wire defines a first plane, and the projection of the reinforcement plate includes an elastic stopper member with a door contacting surface that extends in a direction that is non-parallel to the first plane.

3. The door striker assembly according to claim 1, wherein
the first end of the striker wire is fixedly attached to the reinforcement plate and the second end of the striker wire is fixedly attached to the base plate.

4. The door striker assembly according to claim 1, wherein
the reinforcement plate includes a fourth opening aligned with the second opening, and
the second end of the striker wire extends through the second opening and the fourth opening with both the first end and the second end of the striker wire being fixedly attached to the reinforcement plate.

5. A door striker assembly comprising:
a vehicle body assembly defining a door opening with a sill assembly;
a first door movable between a closed orientation covering a first portion of the door opening and an open orientation exposing the first portion of the door opening;
a second door movable between a closed orientation covering a second portion of the door opening and an open orientation exposing the second portion of the door opening;
a base plate fixedly attached to the sill assembly within the door opening, the base plate having a first surface overlaying a portion of the sill assembly and a second surface, with a first opening and a second opening both extending from the first surface to the second surface, the first surface having an offset portion with the first opening being open to the offset portion;
a reinforcement plate dimensioned to fit within the offset portion of the first surface and having a third opening aligning with the first opening; and
a striker wire having a first end, a second end and a latch engaging portion located between the first end and the second end, the first end extending through the first opening and the third opening and being non-movably connected to at least one of the reinforcement plate and the base plate, and the second end extending through the second opening and being non-movably connected to the base plate.

6. The door striker assembly according to claim 5, wherein
the reinforcement plate includes an attachment portion and a projection that extends from the attachment portion, the attachment portion being located within the offset portion of the first surface of the base plate, the attachment portion defining the third opening.

7. The door striker assembly according to claim 6, wherein
the attachment portion has a planar surface that contacts the offset portion of the first surface of the base plate, with the projection of the reinforcement plate extending in a direction perpendicular to the attachment portion.

8. The door striker assembly according to claim 7, wherein
the striker wire defines a first plane, and
the projection of the reinforcement plate includes an elastic stopper member with a door contacting surface that extends in a direction that is non-parallel to the first plane.

9. The door striker assembly according to claim 8, wherein
the elastic stopper member is positioned such that with the first door in the closed orientation, the elastic stopper member is confined between the first door and an area of the sill assembly restricting movement of the first door.

10. The door striker assembly according to claim 5, wherein
the first end of the striker wire is fixedly attached to the reinforcement plate and the second end of the striker wire is fixedly attached to the base plate.

11. The door striker assembly according to claim 5, wherein
the reinforcement includes a fourth opening aligned with the second opening, and
the second end of the striker wire extends through the second opening and the fourth opening with both the first end and the second end of the striker wire being fixedly attached to the reinforcement plate.

\* \* \* \* \*